United States Patent [19]

Hunter

[11] 4,298,479
[45] Nov. 3, 1981

[54] SECONDARY RECOVERY PROCESS UTILIZING THICKENED WATER

[75] Inventor: Walter D. Hunter, Houston, Tex.

[73] Assignee: Texaco Development Corporation, White Plains, N.Y.

[21] Appl. No.: 118,283

[22] Filed: Feb. 4, 1980

Related U.S. Application Data

[63] Continuation-in-part of Ser. No. 876,389, Feb. 9, 1978, abandoned.

[51] Int. Cl.³ .............................................. E21B 43/22
[52] U.S. Cl. ............................... 252/8.55 D; 166/275; 528/171
[58] Field of Search ................... 252/8.55 D; 166/274, 166/275; 528/171

[56] References Cited

U.S. PATENT DOCUMENTS

| | | | |
|---|---|---|---|
| 3,308,883 | 3/1967 | Foster | 252/8.55 D X |
| 3,508,612 | 4/1970 | Reisberg et al. | 252/8.55 D X |
| 4,043,922 | 8/1977 | Palmer et al. | 252/8.55 D |
| 4,077,471 | 3/1978 | Shupe et al. | 166/275 |

Primary Examiner—Herbert B. Guynn
Attorney, Agent, or Firm—Carl G. Ries; Robert A. Kulason; Walter D. Hunter

[57] ABSTRACT

Hydrocarbons are recovered from subterranean formations by injecting into a hydrocarbon bearing formation via an injection well a fluid comprising water containing a small amount of a water-soluble, ethoxylated, sulfonated poly-(2,6-dialkyl phenol), forcing the said fluid through the formation and recovering hydrocarbons through a production well. The fluids employed may, if desired, contain an alkaline agent such as sodium hydroxide. Optionally, the fluids can be saturated with carbon dioxide and/or natural gas at the injection pressure.

10 Claims, No Drawings

SECONDARY RECOVERY PROCESS UTILIZING THICKENED WATER

This is a continuation-in-part of application Ser. No. 876,389, filed Feb. 9, 1978, now abandoned.

BACKGROUND OF THE INVENTION

1. Field of the Invention

This invention relates to a process for recovering hydrocarbons from a subterranean hydrocarbon-bearing formation penetrated by an injection well and a production well wherein a fluid such as water thickened with a water-soluble, ethoxylated, sulfonated poly-(2,6-dialkyl phenol) is utilized to displace hydrocarbons in the formation toward a production well.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

There is a definite need in the art for a water flooding process in which the disadvantages discussed above are largely eliminated or avoided.

SUMMARY OF THE INVENTION

This invention relates to a process for recovering hydrocarbons from a subterranean hydrocarbon-bearing formation penetrated by an injection well and a production well which comprises:

(a) injecting into the formation via an injection well a driving fluid comprising water having dissolved therein a small amount of an ethoxylated, sulfonated poly-(2,6-dialkyl phenol), (b) forcing the said fluid through the formation and (c) recovering hydrocarbons through the production well.

Another embodiment of this invention relates to the driving fluid compositions utilized in step (a).

DETAILED DESCRIPTION OF THE INVENTION

Prior to practicing the process of this invention it is sometimes desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction in the formation at pressures of from about 300 to about 3000 psig which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferable that they be. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.016 to about 0.093 inches).

The water-soluble, ethoxylated, sulfonated poly-(2,6-dialkyl phenols) useful in preparing the driving fluids of this invention comprise recurring A-type units of the formula:

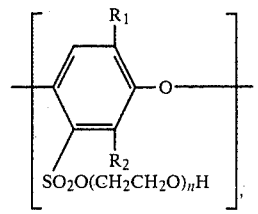

wherein $R_1$ and $R_2$ are independently selected straight chain alkyl groups of 1 to 3 inclusive carbon atoms and $n$ is an integer of from 3 to about 30, and recurring B-type units of the formula:

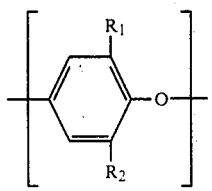

wherein $R_1$ and $R_2$ have the same meaning as previously described and wherein in the said ethoxylated, sulfonated poly-(2,6-dialkyl phenol) the weight percent of A-type units ranges from about 20 to about 60 with the balance being B-type units.

The number average molecular weight of the ethoxylated, sulfonated poly-(2,6-dialkyl phenols) utilized in preparing the driving fluids of this invention will range from about 5000 to about 250,000 or more and preferably will be from about 5000 to about 50,000. Generally, the driving fluid will contain dissolved therein about 0.01 to about 2.0 weight percent of the above-described water-soluble ethoxylated, sulfonated poly-(2,6-dialkyl phenol). Optionally, the driving fluid may be saturated with carbon dioxide and/or natural gas at the injection pressure which generally will be from about 300 to about 3000 psig or more.

The above-described ethoxylated, sulfonated poly-(2,6-dialkyl phenols) can be conveniently prepared by a number of processes well known in the art. For example, ethylene oxide can be reacted with the corresponding sulfonated poly-(2,6-dialkyl phenol) which comprises recurring units of the formula:

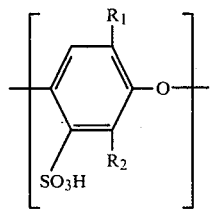

and of the formula:

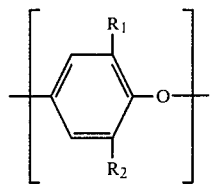

where $R_1$ and $R_2$ have the same meaning as previously described. Generally, the sulfonated starting material is dissolved in a suitable solvent which can be, for example water, throughout which an alkaline catalyst, such as sodium hydroxide or potassium hydroxide is uniformly dispersed. The quantity of the catalyst utilized generally will be from about 0.15 to about 1.0 percent by weight of the reactants. Preferably, the reaction temperature will range from about 80° C. to about 180° C. while the reaction time will be from about 0.5 to about 20 hours or more depending on the particular reaction conditions employed. This process is more completely described in U.S. Pat. Nos. 2,425,845; 3,062,247; 2,174,761 and 2,425,755. The sulfonated poly-(2,6-dialkyl phenol) starting materials can be made in the manner set out in U.S. Pat. No. 3,308,883.

If desired, the driving fluid, that is water having dissolved therein the above-described polymeric thickening agent may be made alkaline by addition of an alkaline agent. The advantageous results achieved with the aqueous alkaline medium used in the process of this invention are believed to be derived from the wettability improving characteristics of the alkaline agent.

Useful alkaline agents include compounds selected from the group consisting of alkali metal hydroxides, alkaline earth metal hydroxides, and the basic salts of the alkali metal or alkaline earth metals which are capable of hydrolyzing in an aqueous medium to give an alkaline solution. The concentration of the alkaline agent employed in the drive fluid is generally from about 0.005 to about 0.3 weight percent. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, potassium hypochlorite, sodium carbonate, and potassium carbonate.

A wide variety of surfactants such as linear alkylaryl sulfonates, alkyl poly-ethoxylated sulfates, etc. may also be included as part of the driving fluid composition. Generally about 0.001 to about 1.0 or more weight percent of the surfactant will be included in the driving fluid.

This invention is best understood by reference to the following example which is offered only as an illustrative embodiment of this invention and is not intended to be limitative.

EXAMPLE I

In a field in which the primary production has already been exhausted, an injection well is completed in the hydrocarbon-bearing formation and perforations are formed between the interval of 5921–5936 feet. A production well is drilled approximately 410 feet distance from the injection well, and perforations are similarly made in the same hydrocarbon-bearing formation at 5926–5941 feet.

The hydrocarbon-bearing formation in both the injection well and the production well is hydraulically fractured using conventional techniques, and a gravel-sand mixture is injected into the fracture to hold it open and prevent healing of the fracture.

In the next step water at a temperature 62° F. made alkaline by the addition of 0.019 weight percent sodium hypochlorite and containing dissolved therein 0.35 weight percent of an ethoxylated polyphenol having a number average molecular weight of about 27,500 and consisting essentially of recurring units of the formula:

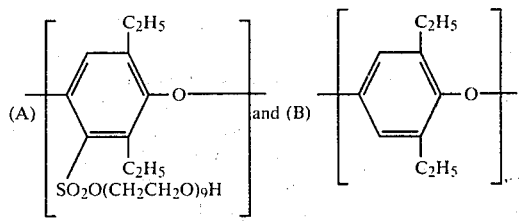

wherein the weight percent of the A units is about 40.3, is injected via the injection well into the formation at a pressure of 2150 psig and at the rate of 1 barrel per minute. Injection of the driving fluid is continued at the rate of 1 barrel per minute and at the end of 78 days the rate of production of oil is substantially greater than with water injection alone.

What is claimed is:

1. A process for recovering hydrocarbons from a subterranean hydrocarbon-bearing formation penetrated by an injection well and a production well which comprises:
   (a) injecting into the formation via an injection well a driving fluid comprising water having dissolved therein about 0.01 to about 2.0 weight percent of a water-soluble ethoxylated sulfonated poly-(2,6-dialkyl phenol) having a number average molecular weight of from about 5000 to about 250,000.
   (b) forcing the said fluid through the formation, and
   (c) recovering hydrocarbons through the production well and wherein the said water-soluble ethoxylated sulfonated poly-(2,6-dialkyl phenol) comprises recurring A-type units of the formula:

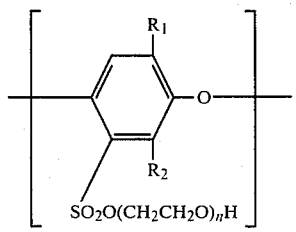

wherein $R_1$ and $R_2$ are independently selected straight chain alkyl groups of 1 to 3 inclusive carbon atoms and n is an integer of from 3 to about 30, and recurring B-type units of the formula:

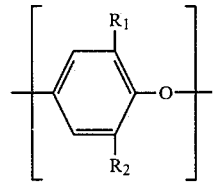

wherein $R_1$ and $R_2$ have the same meaning as previously described and wherein in the said ethoxylated, sulfonated poly-(2,6-dialkyl phenol) the weight percent of A-type units ranges from about 20 to about 60 with the balance being B-type units.

2. The process of claim 1 wherein the said driving fluid contains a surfactant.

3. The process of claim 1 wherein $R_1$ is ethyl and $R_2$ is ethyl.

4. The process of claim 1 wherein the said driving fluid includes about 0.005 to 0.3 weight percent of an alkaline agent selected from the group consisting of sodium hydroxide, potassium hydroxide and sodium hypochlorite.

5. The process of claim 1 wherein the said driving fluid is saturated with a material selected from the group consisting of carbon dioxide and natural gas at a pressure of about 300 to about 3000 psig.

6. A fluid for recovering hydrocarbons from subterranean formations comprising water having dissolved therein about 0.01 to about 2.0 weight percent of a water-soluble ethoxylated, sulfonated poly-(2,6-dialkyl phenol) which comprises recurring A-type units of the formula:

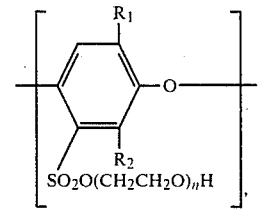

wherein $R_1$ and $R_2$ are independently selected straight chain alkyl groups of 1 to 3 inclusive carbon atoms and n is an integer of from 3 to about 30, and recurring B-type units of the formula:

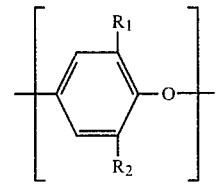

wherein $R_1$ and $R_2$ have the same meaning as previously described and wherein in the said ethoxylated, sulfonated poly-(2,6-dialkyl phenol) the weight percent of A-type units ranges from about 20 to about 60 with the balance being B-type units.

7. The fluid of claim 6 wherein $R_1$ is ethyl and $R_2$ is ethyl.

8. The fluid of claim 6 wherein about 0.005 to about 0.3 weight percent of an alkaline agent selected from the group consisting of sodium hydroxide, potassium hydroxide and sodium hypochlorite is included.

9. The fluid of claim 6 wherein about 0.001 to about 1.0 weight percent of a surfactant selected from the group consisting of alkylaryl sulfonates and alkyl polyethoxylated sulfates is included.

10. The fluid of claim 6 wherein the said fluid is saturated with a material selected from the group consisting of carbon dioxide and natural gas at a pressure of about 300 to about 3000 psig.

* * * * *